United States Patent
Schmidt

(10) Patent No.: US 11,764,411 B2
(45) Date of Patent: Sep. 19, 2023

(54) HIGH-VOLTAGE BATTERY FOR A MOTOR VEHICLE HAVING A DETECTION DEVICE FOR DETECTING DAMAGE TO THE HIGH-VOLTAGE BATTERY, METHOD FOR DETECTING DAMAGE TO THE HIGH-VOLTAGE BATTERY, AND MOTOR VEHICLE

(71) Applicant: Bayerische Motoren Werke Aktiengesellschaft, Munich (DE)

(72) Inventor: Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 363 days.

(21) Appl. No.: 16/957,399

(22) PCT Filed: Feb. 20, 2019

(86) PCT No.: PCT/EP2019/054138
§ 371 (c)(1),
(2) Date: Jun. 24, 2020

(87) PCT Pub. No.: WO2019/179709
PCT Pub. Date: Sep. 26, 2019

(65) Prior Publication Data
US 2020/0335833 A1  Oct. 22, 2020

(30) Foreign Application Priority Data

Mar. 22, 2018  (DE) .................... 10 2018 204 374.4

(51) Int. Cl.
*H01M 10/42* (2006.01)
*H01M 10/48* (2006.01)
(Continued)

(52) U.S. Cl.
CPC .......... *H01M 10/425* (2013.01); *B60L 50/64* (2019.02); *H01M 10/4228* (2013.01);
(Continued)

(58) Field of Classification Search
None
See application file for complete search history.

(56) References Cited

U.S. PATENT DOCUMENTS

| | | | |
|---|---|---|---|
| 2015/0171486 A1 | 6/2015 | Rawlinson | |
| 2020/0035082 A1* | 1/2020 | Lee | G08B 21/182 |
| 2020/0388888 A1* | 12/2020 | Mikami | G01L 5/00 |

FOREIGN PATENT DOCUMENTS

| | | |
|---|---|---|
| CN | 104733795 A | 6/2015 |
| CN | 205355098 U | 6/2016 |

(Continued)

OTHER PUBLICATIONS

Chinese-language Office Action issued in Chinese Application No. 201980008327.4 dated Mar. 18, 2022 with English translation (16 pages).
(Continued)

*Primary Examiner* — Wyatt P McConnell
(74) *Attorney, Agent, or Firm* — Crowell & Moring LLP

(57) ABSTRACT

A high-voltage battery for a motor vehicle includes a battery housing for receiving a plurality of battery modules in an interior space of the battery housing, and a detection device for detecting damage to the battery housing. The detection device includes at least one pressure sensor arranged in the interior space of the battery housing, which is configured to detect a pressure signal in the interior space of the battery housing, and an evaluation unit, which is configured to identify the damage to the battery housing based on the
(Continued)

pressure signal detected by the pressure sensor. A method and a motor vehicle using the high-voltage battery are also provided.

10 Claims, 2 Drawing Sheets

(51) Int. Cl.
*H01M 50/249* (2021.01)
*B60L 50/64* (2019.01)
*H01M 50/271* (2021.01)
*H01M 50/227* (2021.01)

(52) U.S. Cl.
CPC ......... *H01M 10/48* (2013.01); *H01M 50/249* (2021.01); *H01M 10/486* (2013.01); *H01M 50/227* (2021.01); *H01M 50/271* (2021.01); *H01M 2220/20* (2013.01); *Y02E 60/10* (2013.01)

(56) References Cited

FOREIGN PATENT DOCUMENTS

| | | |
|---|---|---|
| DE | 10 2013 013 754 A1 | 8/2014 |
| DE | 10 2014 017 990 A1 | 6/2015 |
| DE | 10 2015 002 573 A1 | 9/2016 |
| DE | 10 2017 211 047 A1 | 1/2019 |
| EP | 2 887 446 A1 | 6/2015 |
| EP | 2 557 615 B1 | 2/2017 |
| KR | 10-2014-0087425 A | 7/2014 |

OTHER PUBLICATIONS

International Search Report (PCT/ISA/210) issued in PCT Application No. PCT/EP2019/054138 dated Apr. 4, 2019 with English translation (five pages).
German-language Written Opinion (PCT/ISA/237) issued in PCT Application No. PCT/EP2019/054138 dated Sep. 26, 2019 with English translation (eleven pages).
German-language Search Report issued in German Application No. 10 2018 204 374.4 dated Feb. 12, 2019 with partial English translation (13 pages).

* cited by examiner

HIGH-VOLTAGE BATTERY FOR A MOTOR VEHICLE HAVING A DETECTION DEVICE FOR DETECTING DAMAGE TO THE HIGH-VOLTAGE BATTERY, METHOD FOR DETECTING DAMAGE TO THE HIGH-VOLTAGE BATTERY, AND MOTOR VEHICLE

BACKGROUND AND SUMMARY OF THE INVENTION

The invention relates to a high-voltage battery for a motor vehicle, having a battery housing for accommodating a multiplicity of battery modules in an interior of the battery housing and having a detection device for detecting damage to the battery housing. The invention also relates to a method for detecting damage to a battery housing of a high-voltage battery and to a motor vehicle having a high-voltage battery.

At present, interest is focused on high-voltage batteries or high-voltage energy stores for electrically drivable motor vehicles, for example electric vehicles or hybrid vehicles. Such motor vehicles usually have, in the drive train, an electrical drive machine or an electric motor driving the motor vehicle as well as the high-voltage battery which provides electrical energy for the electrical drive machine. Such high-voltage batteries comprise a multiplicity of battery modules which are arranged in an interior or accommodating space of a battery housing and are connected there. In the case of an event which is critical for the high-voltage battery, for example in the event of an accident involving the motor vehicle, the battery housing may be damaged, for example deformed. In order to check the high-voltage battery after such an event which can be perceived by the driver, the high-voltage battery is usually checked in a workshop. Only after this check can it be determined whether the high-voltage battery can still be used. However, it is problematic if the driver does not perceive an event causing a deformation and does not initiate the check in the workshop. Such an event may be, for example, driving over an obstacle which deforms the battery housing. However, a deforming event may also occur when a vehicle is parked, for example as a result of a retractable bollard.

In this respect, DE 10 2013 013 754 A1 proposes the practice of equipping a high-voltage battery with an acceleration sensor. If the acceleration sensor has identified an acceleration process during which a predetermined acceleration limit value has been reached or exceeded, an assessment can be carried out in good time. According to the prior art, a check is therefore only carried out in order to determine whether or not the acceleration exceeds a maximum permissible limit value. However, this check is very inaccurate since the high-voltage storage device can be damaged by a critical event and cannot be used further or can be used further only to a limited extent even though the maximum permissible limit value of the acceleration has not been exceeded. The use of the acceleration sensor also does not make it possible to determine whether there is other damage, for example a leakage of the battery housing. Furthermore, the above-mentioned case of the retractable bollard also cannot be detected thereby.

An object of the present invention is to provide a solution of how damage to a battery housing of a high-voltage battery for a motor vehicle can be detected in a particularly simple and reliable manner.

This object is achieved, according to the invention, by means of a high-voltage battery, a method and a motor vehicle having the features according to the respective independent patent claims. The dependent patent claims, the description and the figures relate to advantageous embodiments of the invention.

The invention relates to a high-voltage battery for a motor vehicle, having a battery housing for accommodating a multiplicity of battery modules in an interior of the battery housing and having a detection device for detecting damage to the battery housing. The detection device has at least one pressure sensor which is arranged in the interior of the battery housing and is designed to detect a pressure signal in the interior of the battery housing. The detection device also has an evaluation device which is designed to identify the damage to the battery housing on the basis of the pressure signal detected by the pressure sensor.

The invention also relates to a method for detecting damage to a battery housing of a high-voltage battery of a motor vehicle. In this case, at least one pressure sensor arranged in an interior of the battery housing detects a pressure signal in the interior of the battery housing. An evaluation device identifies the damage to the battery housing on the basis of the pressure signal detected by the at least one pressure sensor.

The high-voltage battery is, in particular, a traction battery for the motor vehicle in the form of an electric or hybrid vehicle. The high-voltage battery comprises a multiplicity of battery modules. The battery modules have a multiplicity of battery cells which are in the form of prismatic battery cells, for example, can be stacked to form a cell block and can be connected to one another there. These battery modules are arranged in the interior or accommodating space of the battery housing and are likewise connected there. In order to be able to identify damage, for example a deformation, of the battery housing, the high-voltage battery has the detection device. The detection device has the at least one pressure sensor and the evaluation device. In this case, at least the pressure sensor is arranged in the interior of the battery housing. The pressure sensor may be in the form of a MEMS component, for example, and can therefore be arranged in the battery housing in a particularly space-saving manner.

By detecting the pressure signal, the pressure sensor can monitor the pressure or gas pressure inside the battery housing by measuring the pressure in the interior of the battery housing continuously or at predetermined measuring times. The pressure signal therefore contains values for the pressure in the interior over time. This pressure signal is made available to the evaluation device of the detection device. The evaluation device and the pressure sensor may be in the form of an integrated component, for example. However, provision may also be made for the evaluation device to be integrated, for example, in a battery control unit which communicates with the pressure sensor and receives the pressure signals detected by the pressure sensor.

The evaluation device analyzes the pressure signal by searching the pressure signal for events which characterize damage to the battery housing. For example, the evaluation device can monitor the detected pressure values in order to determine whether they change over time and whether the change exceeds a predetermined change threshold value. Such a change corresponds to a deformation event, for example, and therefore indicates damage to the battery housing in the form of a deformation. This is because the battery housing is plastically deformed and the interior is compressed, for example, by a deformation of the battery housing irrespective of the location of the deformation, with the result that the pressure in the interior changes. This change in the pressure can be identified in a particularly reliable manner by means of the at least one pressure sensor and the evaluation device. If the detection device has identified the deformation, it can generate, for example, a warning signal which can be output to the driver of the motor vehicle.

In one embodiment of the high-voltage battery, the at least one pressure sensor is arranged in the interior of the battery housing which is closed in a gas-tight manner, and the evaluation device is designed to classify the damage to the battery housing as a deformation of the battery housing and/or a leakage of the battery housing on the basis of the pressure signal. In particular, the evaluation device is designed to classify the damage as deformation if, on the basis of the pressure signal, it identifies a pressure change in the interior of the battery housing that exceeds a predetermined change threshold value, and to classify the damage as leakage if it identifies that a discrepancy between a pressure value detected on the basis of the pressure signal and an external pressure outside the battery housing undershoots a predetermined discrepancy threshold value.

In the case of a battery housing which is not closed in a gas-tight manner and has, for example, a pressure equalization element in the form of a ventilation element, for example a breathable membrane, only damage in the form of a deformation can be identified, for example after an accident or after driving over an obstacle. In the case of the gas-tight battery housing, damage in the form of a leakage, for example on account of a crack in a wall of the battery housing or on account of a displacement of a sealing element, can be additionally identified. For this purpose, the pressure signal detected by the pressure sensor is analyzed over time in order to detect pressure fluctuations or pressure changes corresponding to deformation events. In addition, the pressure signal is monitored with respect to the discrepancy in the pressure between the interior and the exterior of the battery housing. In other words, a differential pressure value is determined, which describes the difference between the external pressure and the internal pressure.

If the evaluation device has identified that a change in the pressure inside the battery housing exceeds the predetermined change threshold value, the deformation of the battery housing causing the pressure change is identified. If, alternatively or additionally, the evaluation device has identified that the discrepancy reaches the predetermined discrepancy threshold value, the leakage is identified. For example, the leakage is identified if the discrepancy or the differential pressure is approximately zero. If it is therefore identified that the internal pressure in the interior of the battery housing corresponds approximately to the external pressure outside the battery housing, it is identified that the battery housing has a leakage, via which a pressure equalization between the interior and the exterior has taken place. Different forms of damage to the battery housing can therefore be identified by means of a gas-tight battery housing in which the pressure sensor is integrated. For example, it is then possible to output a specific warning signal which advises the driver both of the damage and of the type or form of damage. The battery housing can therefore be checked and repaired, if necessary, in a particularly targeted manner.

In one development of the invention, the evaluation device is designed to receive the external pressure detected by a further vehicle pressure sensor. Alternatively or additionally, the evaluation device is designed to receive data from a provider outside the vehicle and to determine the external pressure on the basis of the data. For example, the further gas pressure sensor which measures the external pressure or ambient pressure can be arranged on the outside of the battery housing or at another installation location on the motor vehicle. This external pressure is transmitted to the evaluation device and is compared with the internal pressure inside the battery housing in order to determine the differential pressure. Alternatively or additionally, the evaluation device can receive the data determined outside the vehicle and can determine the external pressure on the basis of the data. Such data may be, for example, weather data at the current location of the motor vehicle which are transmitted to the evaluation device wirelessly, for example via the mobile radio network.

The evaluation device is preferably designed to classify the damage only as deformation if it detects that a pressure change detected on the basis of the pressure signal exceeds a predetermined change threshold value and a rate of the pressure change exceeds a predetermined rate threshold value. This embodiment is based on the knowledge that the internal pressure in the interior of the battery housing also changes in the event of a temperature change in the interior. In order to now prevent the evaluation device from incorrectly classifying a pressure change resulting from the temperature change as deformation of the gas-tight or non-gas-tight storage device housing, the deformation is identified only if the rate of change exceeds the predetermined rate threshold value. In comparison with a deformation event, temperature changes cause slower pressure changes in the interior which are ignored by the evaluation device. The damage can therefore be detected in a particularly reliable manner.

In one particularly advantageous embodiment, the evaluation device is designed to monitor a temperature in the interior, to determine a change threshold value on the basis of the temperature and to classify the damage as deformation if it detects that a pressure change detected on the basis of the pressure signal exceeds the predetermined change threshold value. It is therefore possible to dispense with an additional evaluation of the rate of change if the temperature of the interior is concomitantly monitored. The approximation using the general gas equation $pV=nRT$ makes it possible to determine the pressure difference caused by a temperature change and to adapt the change threshold value or the detection threshold. Since common MEMS pressure sensors already have an integrated temperature measurement, this embodiment is particularly advantageous.

In one advantageous development of the invention, the evaluation device is designed to additionally identify a severity of the deformation on the basis of the pressure change and to generate a switch-off signal for the high-voltage battery if the severity exceeds a predetermined severity threshold value. In the case of an only slight deformation, the severity of which undershoots the severity threshold value, provision may be made for the evaluation device to generate only a warning signal for the driver. The driver is therefore only advised, for example, to promptly find a workshop for checking the high-voltage storage device. In the event of a severe deformation, the severity of which exceeds the severity threshold value and which may constitute a risk for vehicle occupants of the motor vehicle, the high-voltage battery is switched off by means of the switch-off signal and the motor vehicle is changed to a non-critical state by immobilizing it. In this case, a warning signal is output before the immobilization, in particular, which warning signal advises the driver of the imminent change to the safe state.

Provision may also be made for the detection device to have a gas-tight housing in which the at least one pressure sensor is arranged and which is arranged in the interior of the battery housing in such a manner that damage to the battery housing in the form of a deformation can be transferred to the gas-tight housing. In this case, the battery housing itself is not gas-tight, in particular, and has the pressure equalization element, for example. Although a deformation can also be identified in this case by means of a pressure sensor which is not packaged in a gas-tight manner, since the pressure caused by the ventilation element changes only slowly in comparison with a deformation, a deformation can be identified in a more reliable manner if the pressure sensor is packaged in a gas-tight manner. The pressure sensor surrounded by the gas-tight housing is arranged in this case in such a manner that, in the event of a deformation of the battery housing, the housing of the pressure sensor is also deformed and is plastically deformed. For example, the housing can be arranged on a base in the interior of the battery housing. The gas-tight housing can be formed, for example, by the base of the storage device housing, regions of the side walls of the storage device housing which face the base and a housing cover at a distance from the base of the storage device housing. As a result of the gas-tight housing, the pressure sensor measures a constant, defined pressure without the presence of a deformation event. In the event of plastic deformation of this housing, the pressure in the housing changes, which is detected by the pressure sensor. Providing the gas-tight housing makes it possible to distinguish the deformation of the non-gas-tight battery housing from a pressure equalization process via the ventilation element in a particularly reliable manner.

A motor vehicle according to the invention comprises a high-voltage battery according to the invention or an advantageous embodiment thereof. The motor vehicle is, in particular, in the form of an automobile in the form of an electric or hybrid vehicle.

The embodiments and their advantages presented with respect to the high-voltage battery according to the invention accordingly apply to the method according to the invention and to the motor vehicle according to the invention.

Further features of the invention emerge from the claims, the figures and the description of the figures. The features and combinations of features mentioned above in the description and the features and combinations of features mentioned below in the description of the figures and/or shown in the figures alone can be used not only in the respectively stated combination but also in other combinations or alone.

BRIEF DESCRIPTION OF THE DRAWINGS

The invention is now explained in more detail on the basis of a preferred exemplary embodiment and with reference to the drawings, in which.

In the figures, identical and functionally identical elements are provided with the same reference signs.

DETAILED DESCRIPTION OF THE DRAWINGS

Figure 1:
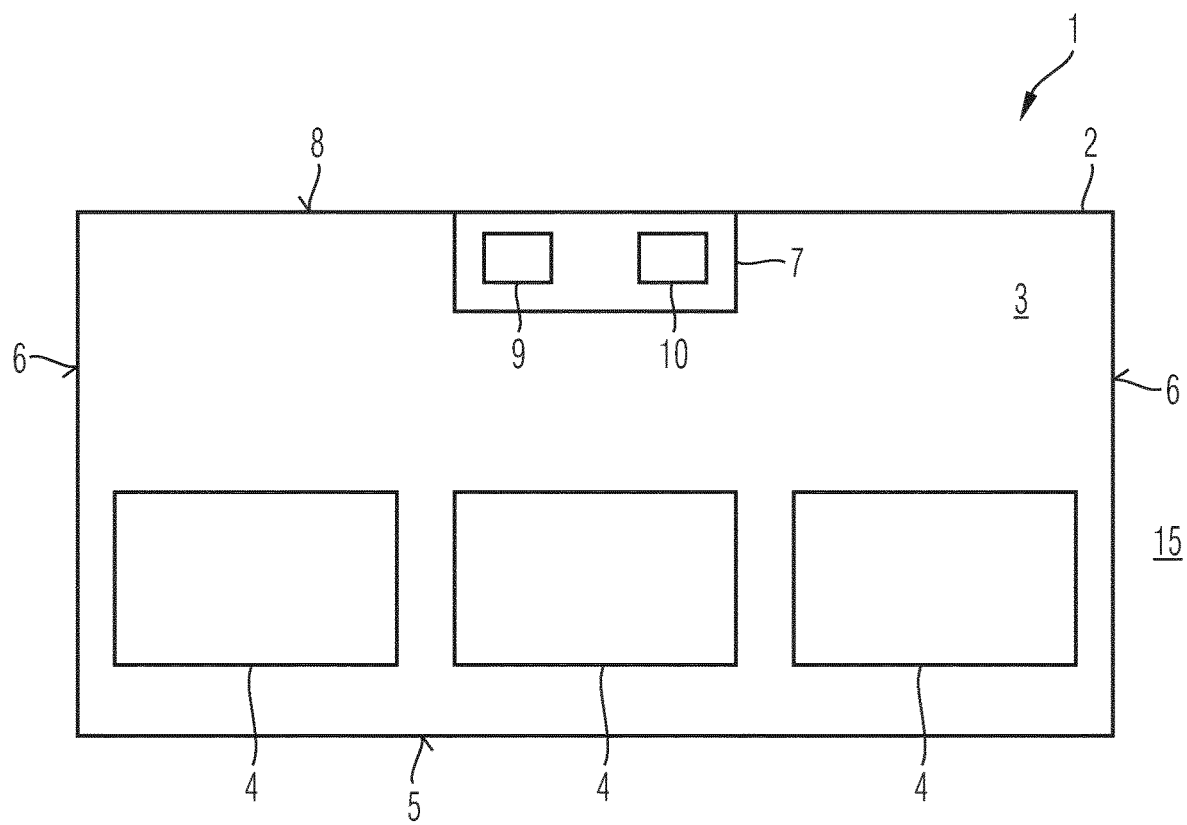
FIG. 1 shows a schematic illustration of a first embodiment of a high-voltage battery according to the invention.

FIG. 1 shows a high-voltage battery 1 for a motor vehicle which is not shown here. The high-voltage battery 1 may be, for example, a traction battery of the electrically drivable motor vehicle. The high-voltage battery 1 has a battery housing 2, in the interior 3 of which a multiplicity of battery modules 4 are arranged. The high-voltage battery 1 may be arranged, for example, in the region of an underbody of the motor vehicle. In the event of an accident involving the motor vehicle or if the motor vehicle drives over an obstacle, the battery housing 2, for example a base 5 or a side wall 6 of the battery housing 2, may be damaged. Such damage to the battery housing 2 may be a deformation and/or a leakage.

In order to detect such damage, the high-voltage battery 1 has a detection device 7. The detection device 7 is arranged here in the region of a cover 8 of the battery housing 2 in the interior 3. However, provision may also be made for the detection device 7 to be arranged at another location in the interior 3, for example in the region of the base 5. The detection device 7 has at least one pressure sensor 9, for example a micro-electromechanical pressure sensor, which is designed to detect a pressure signal in the interior 3 of the battery housing 2. The pressure signal is transmitted to an evaluation device 10 of the detection device 7, which evaluation device analyzes the pressure signal and can identify damage to the battery housing 2 on the basis of the pressure signal. If the damage is identified, the evaluation device 10 can generate, for example, a warning signal for output to a driver of the motor vehicle and/or can generate a switch-off signal for the high-voltage battery 1.

Figure 2:
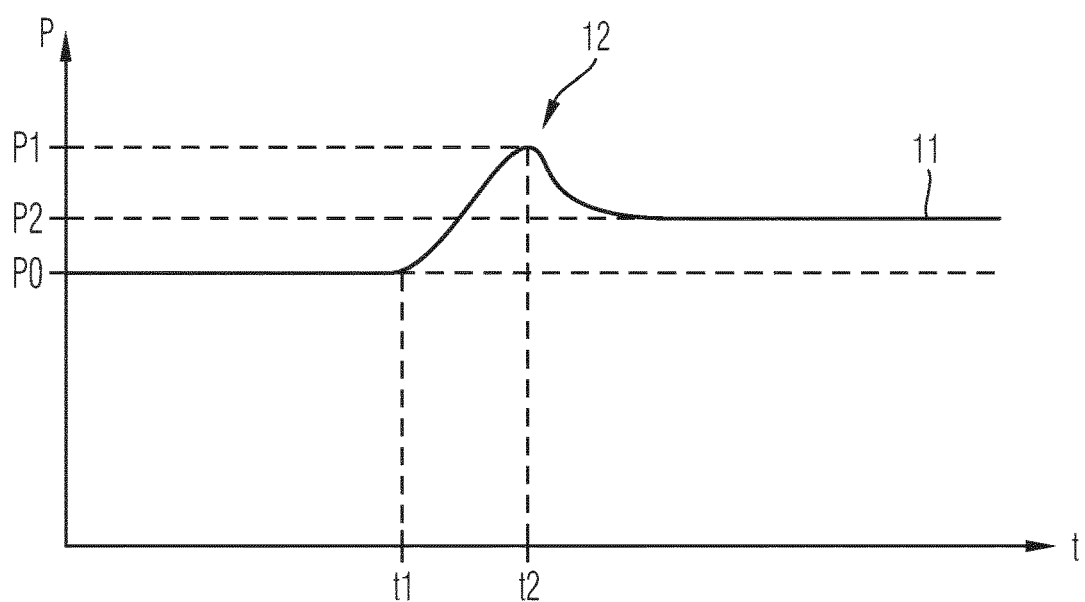
FIG. 2 shows a schematic illustration of a first pressure signal detected by a pressure sensor.

FIG. 2 shows a first pressure signal 11 which has been detected by the pressure sensor 9. In this case, the pressure P in the interior 3 of the storage device housing 2 is plotted against the time t. Until a time t1, the pressure signal 11 has only constant pressure values P0. At the time t1, a deformation event 12 occurs, during which the battery housing 2 is plastically deformed and during which the pressure P changes from the value P0 to a value P1 by the time t2 and finally falls to a value P2>P0. This pressure change P1-P0 or P2-P0 can be identified by the evaluation device 10 in the pressure signal 11. The evaluation device 10 compares the pressure change P1-P0 or P2-P0 with a predetermined change threshold value. The evaluation device 10 can additionally detect the rate of the pressure change and can check whether the rate is greater than a predetermined rate threshold value. For this purpose, the evaluation device 10 can also detect the duration t2−t1 of the pressure change and can compare it with a predetermined period threshold value. If the pressure change is greater than the predetermined change threshold value and the rate or the period is greater than the respective threshold value, the pressure change is identified as a deformation event 12. A pressure change, the rate of which does not exceed the rate threshold value, is not identified as a deformation event. This is because this pressure change can be caused by a temperature change in the interior 3 and/or a leakage in the battery housing 2.

Figure 3:
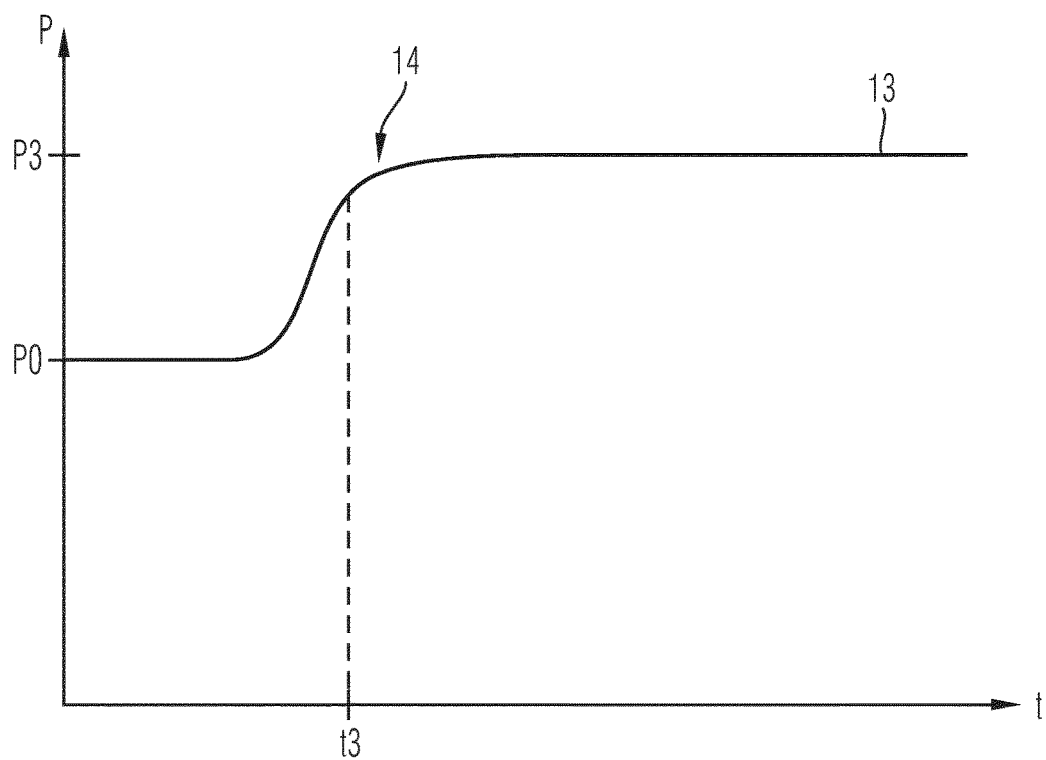
FIG. 3 shows a schematic illustration of a second pressure signal detected by a pressure sensor.

FIG. 3 shows a further pressure signal 13 which was detected by the pressure sensor 9 in the interior 3 of the battery housing 2 closed in a gas-tight manner. In the case of the pressure signal 13, the pressure value P0 is measured until the time t3 and a pressure value P3 is measured after a time t3. A leakage event 14 of the battery housing 2 occurs at the time t3 and causes a pressure equalization between the interior 3 and an exterior 15 (see FIG. 1). If the pressure P0 in the gas-tight storage device housing 2 is greater than an external pressure in the exterior 15, the pressure in the storage device housing 2 falls after the leakage event. If the pressure P0 in the gas-tight storage device housing 2 is less than the external pressure in the exterior 15, the pressure in the storage device housing 2 rises after the leakage event.

This pressure change can again be identified. In order to now avoid incorrectly classifying the pressure change as a deformation event, the pressure P3 after the pressure change is compared with the external pressure. The external pressure can be detected, for example, by a further vehicle pressure sensor and can be transmitted to the evaluation device 10. Provision may also be made for the evaluation device 10 to receive data provided outside the vehicle, for example weather data at the location of the motor vehicle, and to determine the external pressure on the basis of the data. If the differential pressure between the pressure in the interior 3 and the exterior 15 undershoots a predetermined differential pressure threshold value, for example if the differential pressure is approximately zero, damage in the form of a leakage of the battery housing 2 is identified.

Figure 4:
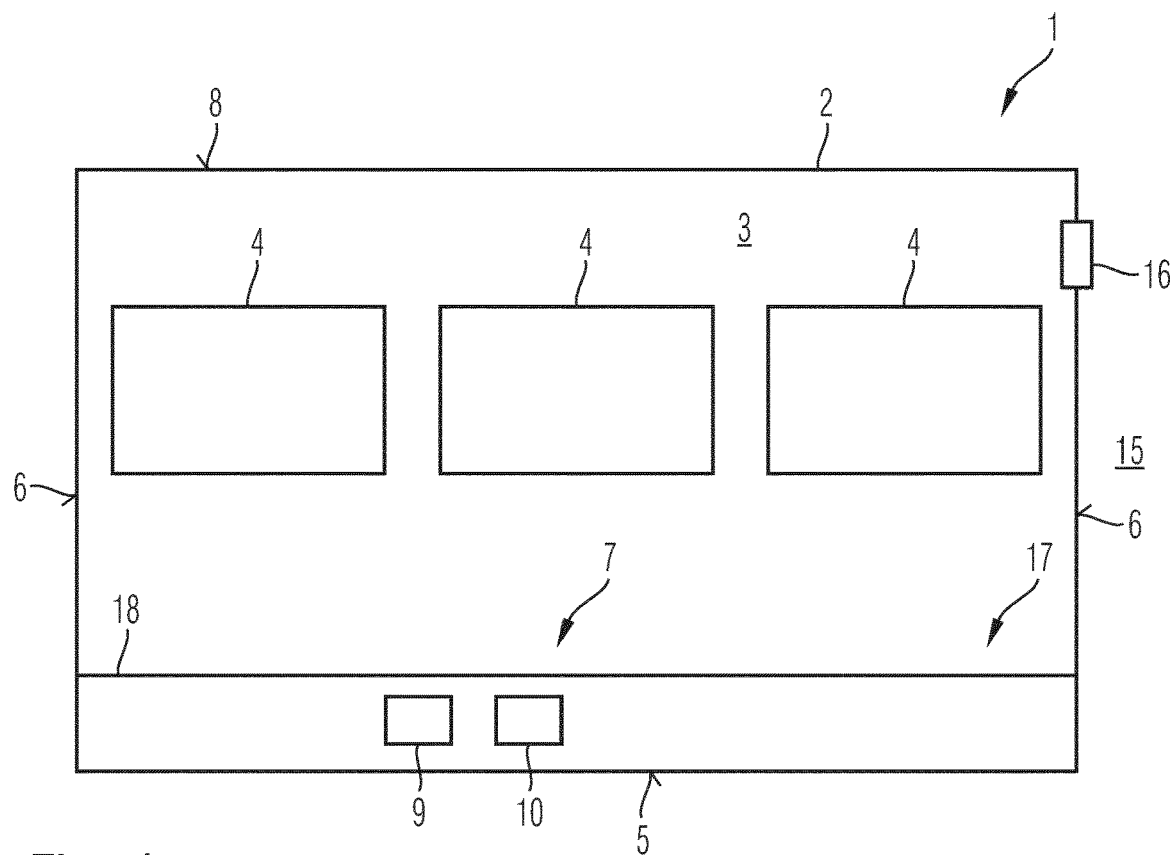
FIG. 4 shows a schematic illustration of a second embodiment of a high-voltage battery according to the invention.

FIG. 4 shows a further embodiment of a high-voltage battery 1 having a storage device housing 2, in the interior 3 of which a multiplicity of battery modules 4 are arranged. The storage device housing 2 is not closed in a gas-tight manner here and has a pressure equalization element 16 which can be arranged in the side wall 6 here. The pressure equalization element 16 may be, for example, a breathable membrane which allows gas to be exchanged between the interior 3 and the exterior 15 for pressure equalization. The pressure in the interior 3 therefore changes on account of the pressure equalization element 16. In this case, it proves to be particularly advantageous if the detection device 7 has a gas-tight housing 17 in which at least the pressure sensor 9 is arranged. The gas-tight housing 17 is arranged in this case in the interior in such a manner that a deformation event of the storage device housing 2 is transferred to the gas-tight housing 17 of the pressure sensor 9. Here, the housing 17 is arranged in the region of the base 5 facing a road for the motor vehicle in the interior of the storage device housing 2. For example, the gas-tight housing 17 can extend over an entire area of the base 5. The gas-tight housing 17 may be formed, for example, by the base 5 of the storage device housing 2 itself, a region of the side walls 6 of the storage device housing 2 and a housing cover 18 at a distance from the base 5. In the event of a deformation of the storage device housing 2, for example when driving over an obstacle, this gas-tight housing 17 is concomitantly deformed, in which case the pressure sensor 9 can detect this deformation on the basis of the pressure signal in the gas-tight housing 17.

LIST OF REFERENCE SIGNS

1 High-voltage battery
2 Battery housing
3 Interior
4 Battery module
5 Base
6 Side wall
7 Detection device
8 Cover
9 Pressure sensor
10 Evaluation device
11 First pressure signal
12 Deformation event
13 Second pressure signal
14 Leakage event
15 Exterior
16 Pressure equalization element
17 Gas-tight housing
18 Housing cover
P Pressure
t Time
P0, P1, P2, P3 Pressure values
t1, t2, t3 Times

What is claimed is:

1. A high-voltage battery for a motor vehicle, comprising:
a battery housing for accommodating a plurality of battery modules in an interior of the battery housing;
a detection device for detecting damage to the battery housing, wherein the detection device has at least one pressure sensor that includes a MEMS component, which is arranged in the interior of the battery housing and is designed to detect a pressure signal in the interior of the battery housing;
an evaluation device, which is designed to identify the damage to the battery housing based on the pressure signal detected by the pressure sensor; and
a pressure equalization element including a breathable membrane that is disposed in a side wall of the battery housing and is configured to allow gas to be exchanged between the interior of the battery housing and an exterior of the battery housing for pressure equalization.

2. The high-voltage battery according to claim 1,
wherein the evaluation device is designed to classify the damage to the battery housing as at least one of a deformation of the battery housing and a leakage of the battery housing based on the pressure signal.

3. The high-voltage battery according to claim 2,
wherein the evaluation device is designed to classify the damage as deformation based on identifying a pressure change in the interior of the battery housing that exceeds a predetermined change threshold value, and to classify the damage as leakage based on identifying that a discrepancy between a pressure value detected based on the pressure signal and an external pressure outside the battery housing undershoots a predetermined discrepancy threshold value.

4. The high-voltage battery according to claim 3,
wherein the evaluation device is designed to receive the external pressure detected by a further vehicle pressure sensor, and/or the evaluation device is designed to receive data from a provider outside the vehicle and to determine the external pressure based on the data.

5. The high-voltage battery according to claim 1,
wherein the evaluation device is designed to classify the damage only as deformation if it detects that a pressure change detected based on the pressure signal exceeds a predetermined change threshold value and a rate of the pressure change exceeds a predetermined rate threshold value.

6. The high-voltage battery according to claim 1,
wherein the evaluation device is designed to monitor a temperature in the interior, to determine a change threshold value based on the temperature and to classify the damage as deformation if it detects that a pressure change detected based on the pressure signal exceeds the predetermined change threshold value.

7. The high-voltage battery according to claim 3,
wherein the evaluation device is designed to additionally identify a severity of the deformation based on the pressure change and to generate a switch-off signal for the high-voltage battery if the severity exceeds a predetermined severity threshold value.

8. The high-voltage battery according to claim 1,
wherein the detection device has a gas-tight housing in which the at least one pressure sensor is arranged and which is arranged in the interior of the battery housing in such a manner that damage to the battery housing in the form of a deformation can be transferred to the gas-tight housing.

9. A motor vehicle having a high-voltage battery according to claim 1.

10. A method for detecting damage to a battery housing of a high-voltage battery of a motor vehicle, wherein at least one pressure sensor that includes a MEMS component arranged in an interior of the battery housing detects a pressure signal in the interior of the battery housing, and an evaluation device identifies the damage to the battery housing based on the pressure signal detected by the at least one pressure sensor, wherein a pressure equalization element including a breathable membrane is disposed in a side wall of the battery housing and allows gas to be exchanged between the interior of the battery housing and an exterior of the battery housing for pressure equalization.

* * * * *